Jan. 27, 1970    J. HALLER    3,491,423
COMPOSITE LIGHTWEIGHT ANTIFRICTION BEARING BALL
Filed Feb. 2, 1967    2 Sheets-Sheet 1
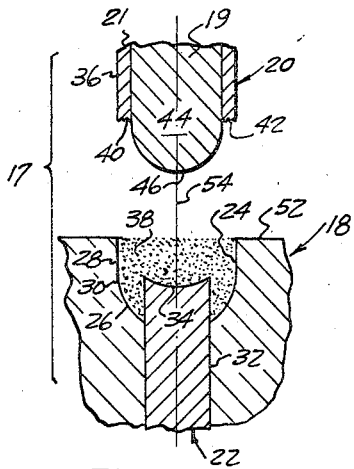
FIG. 1
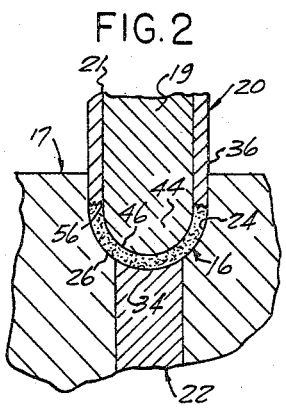
FIG. 2
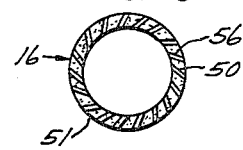
FIG. 10
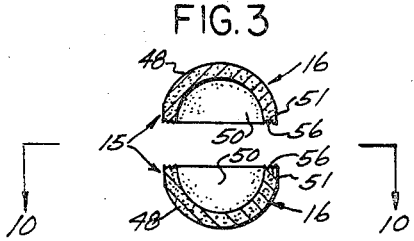
FIG. 3
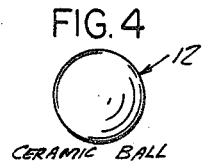
FIG. 4
CERAMIC BALL
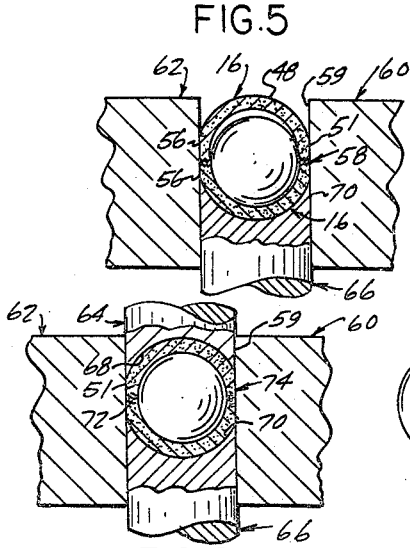
FIG. 5
FIG. 6
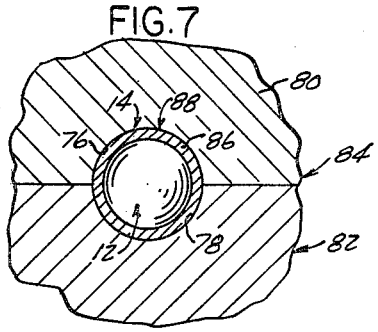
FIG. 7
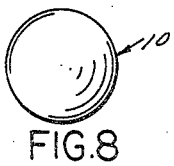
FIG. 8
INVENTOR
JOHN HALLER
BY Barthel & Bugbee
ATTORNEYS INVENTOR
JOHN HALLER
BY Barthel & Bugbee
ATTORNEYS United States Patent Office 3,491,423
Patented Jan. 27, 1970

3,491,423
COMPOSITE LIGHTWEIGHT ANTIFRICTION BEARING BALL
John Haller, Northville, Mich., assignor to Federal-Mogul Corporation, Detroit, Mich., a corporation of Michigan
Filed Feb. 2, 1967, Ser. No. 613,524
Int. Cl. B22f 5/00, 7/08; F16c 33/32
U.S. Cl. 29—182.3                                   2 Claims

ABSTRACT OF THE DISCLOSURE

This composite lightweight antifriction bearing ball has a spherical core of lightweight ceramic alumina surrounded by a hollow snugly-fitted spherical shell of sintered powdered steel.

BACKGROUND OF THE INVENTION

Prior large bearing balls such as are used for antifriction bearing assemblies in large machines, for example, rockets for ballistic missiles and space vehicles, are very heavy and not only consume valuable weight in such a vehicle but also are subject to high centrifugal forces and excessive inertia and momentum. Moreover, such prior large bearing balls, because of their great diameters and consequently large volume of steel, also possess very little resilience.

SUMMARY OF THE INVENTION

The composite ball bearing of the present invention eliminates these disadvantages by being composed of a spherical lightweight ceramic core surrounded by a hollow spherical shell of sintered powdered steel, both being ground to true sphericity. The invention and method of making it have been summarized above in the abstract of disclosure. The composite lightweight bearing ball thus produced has the advantage of greatly reduced weight because of the fact that the spherical ceramic core, if made of alumina (aluminum oxide $Al_2O_3$) possesses only approximately one-third of the weight of a steel ball of the same size. Because of this reduction in weight, this composite lightweight ball greatly reduces the centrifugal forces arising in its use and also possesses greatly reduced inertia and momentum. Because of the greater yieldability of the composite construction, this ball also possesses much greater resilience than a solid steel ball of the same diameter.

In the drawings, FIGURE 1 is a diagrammatic central vertical section through the die cavity of a briquetting press filled with powdered steel, and before briquetting;

FIGURE 2 is a view similar to FIGURE 1 but showing the position of the punch and die after briquetting;

FIGURE 3 is a central vertical section through a pair of hollow hemispherical powdered steel briquettes ready for assembly;

FIGURE 4 is a side elevation of the hard spherical ceramic core of the composite lightweight bearing ball of this invention;

FIGURE 5 is a central vertical section through the die cavity of a briquetting press containing the ceramic core of FIGURE 4 inside the two hollow hemispherical powdered steel briquettes of FIGURE 3;

FIGURE 6 is a view similar to FIGURE 5, but showing the composite briquette of FIGURE 5 after further compression which has crumbled the opposing rim serrations of the hollow hemispherical briquettes;

FIGURE 7 is a diagrammatic central vertical section through the two die halves of a coining press after the sintered composite lightweight bearing ball of FIGURE 6 has been subjected to a coining operation for further densification;

FIGURE 8 is a side elevation of the composite lightweight antifriction bearing ball of FIGURE 7 after being finish-ground to true sphericity;

FIGURE 10 is a top plan view along the line 10—10 in FIGURE 3.

Figure 9:
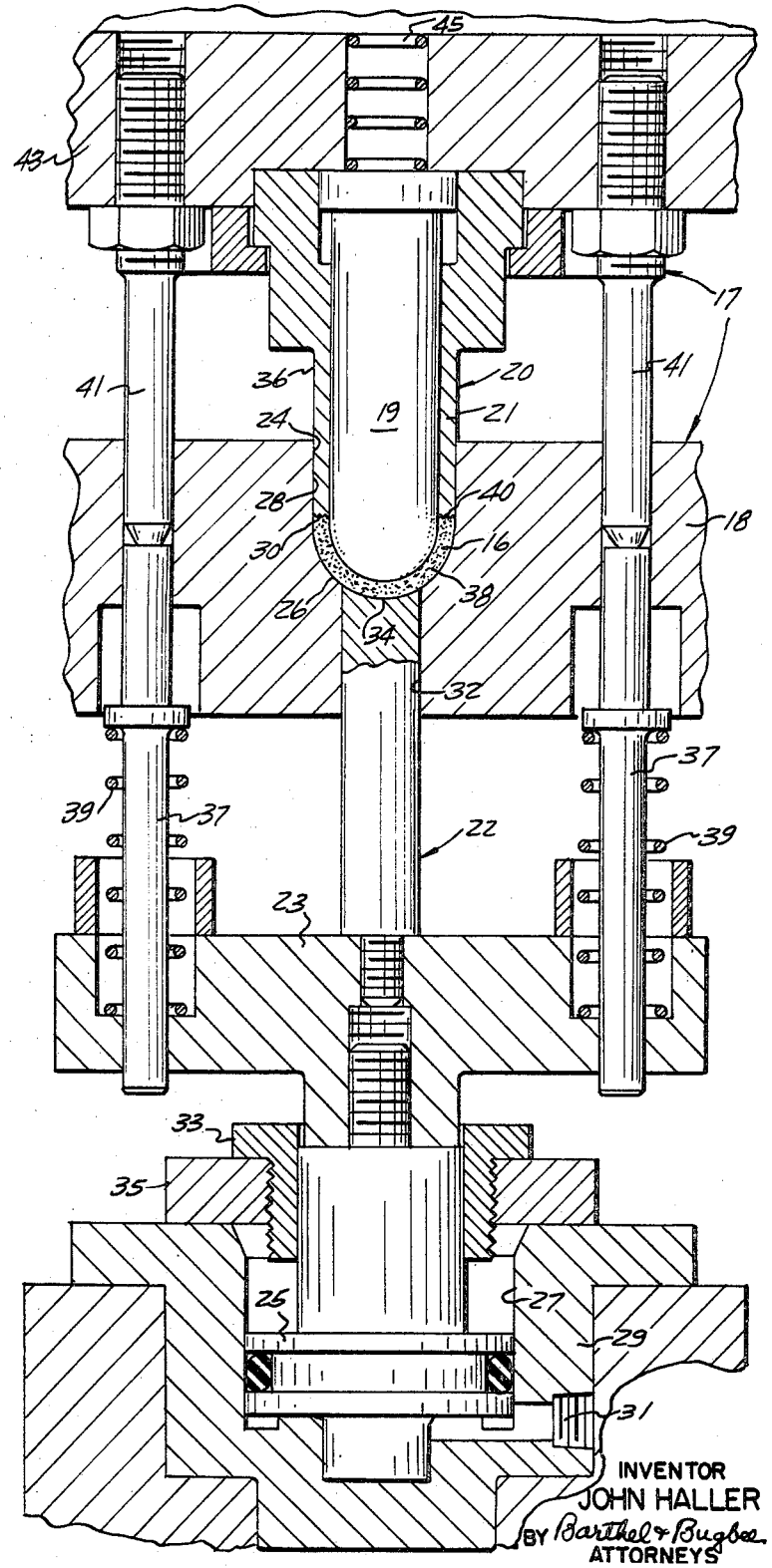
FIGURE 9 is a diagrammatic central vertical section through the briquetting press of FIGURES 1 and 2 with the parts in the positions of FIGURE 2.

Referring to the drawing in detail, FIGURE 8 shows a composite lightweight antifriction bearing ball, generally designated 10, according to the present invention and made by the method thereof as consisting generally of a spherical substantially rigid ceramic core 12 (FIGURE 7) surrounded by a hollow spherical shell 14 of sintered powdered steel which in turn is initially composed of a set 15 (FIGURE 3) of edge-to-edge fitting partly-spherical component shells, preferably of two hemispherical half shells 16 processed according to the method described below. The ball or core 12 is preferably formed of ceramic material, such as alumina (aluminum oxide $Al_2O_3$) which is of high purity. Such ceramic balls are made by conventional methods and apparatus well known to those skilled in the ceramics art and are available commercially on the open market.

Such an unglazed ceramic ball of alumina is of very light weight yet has extremely high strength. Its tensile strength in pounds per square inch is about 16,000 p.s.i., its compressive strength about 180,000 p.s.i., and its flexural strength about 34,000 p.s.i. A similar glazed ceramic ball of steatite (hydrous magnesium silicate) has a tensile strength of about 9000 p.s.i., a compressive strength of about 85,000 p.s.i., and a flexural strength of about 28,000 p.s.i.

Meanwhile, each of the half shells 16 has been prepared in the manner shown in FIGURES 1, 2 and 9. Use is made of a suitable conventional briquetting press 17 employing a die table 18 and upper and lower punches 20 and 22 of suitable steel. The upper punch 20 preferably consists of an inner solid component 19 and an outer tubular component 21. The die 18 is provided with a die cavity 24, the lower portion 26 of which is hemispherical and the upper portion 28 is cylindrical and of the same diameter, joining the lower portion 26 at a circular boundary line 30. Opening into the die cavity 24 is an axial or radial bore 32 in which the lower punch 22 is reciprocably mounted. The lower punch 22 is provided with a concave top surface 34 which is of the same radius of curvature as the hemispherical lower portion 26 of the die cavity 24. FIGURE 9 shows the press 17 in greater detail.

The lower punch 22 is mounted upon a lower ram 23, the single-acting plunger 25 of which reciprocates in the bore 27 of a lower hydraulic cylinder 29 containing a fluid port 31. This permits the lower punch 22 to be moved upward or downward to control the transfer of powdered steel in the die cavity 24. The upward stroke of the plunger 25 and consequently the "fill" of the die cavity 24 with powdered metal, is limited by a flanged tubular threaded stop 33 threaded into the correspondingly-bored and threaded lower cylinder head 35.

The opposite end portions of the ram 23 and die table 18 are bored and counterbored to receive flanged parallel lower rods 37 and their supporting compression springs 39 respectively. The upper ends of the lower rods 37 are engaged by the lower ends of upper push rods 41, the upper ends of which are threaded into and depend from the correspondingly-bored and threaded upper ram 43. The solid inner component 19 of the upper punch 20 is flanged at its upper end and urged downwardly within the counterbored outer component 21 by a compression spring 45 mounted within the upper end and urged downwardly within the counterbored outer component 21 by a compression spring 45 mounted within the upper ram 43. The latter is raised and lowered upon retraction and pressing strokes respectively by a conventional hydraulic plunger above it (not shown) reciprocable in a hydraulic cylinder in the press head (also not shown).

The outer component 21 of the upper punch 20 has a cylindrical outer surface 36 of a suitable diameter to snugly but slidably fit the upper cylindrical portion 28 of the die cavity 24 which is adapted to receive therein a charge 38 of a suitable powdered bearing metal, such as powdered bearing steel. The annular lower end 40 of the outer component 21 of the upper punch 20 is provided with oblique corrugations or serrations 42 to produce the corresponding oblique serraitons 56 on the shell 16 (FIGURE 10), and an inner hemispherical portion 44 on its inner component 19 having a hemispherical surface 46 of substantially the required diameter for the inner surface 50 of the half shell briquette 16, the outer surface 48 of which correspnds in curvature to the lower hemispherical die cavity portion 26 and top surface 34 of the lower punch 22.

In briquetting each of the hemispherical shells 16, the lower punch 22 is moved upward in its bore 32 until its top concave spherical surface 34 occupies a position in the die cavity 24 adapted to leave the desired volume therein for the powdered steel charge 38. The die cavity 24 is then filled with the powdered steel charge 38 by means of a conventional filling shoe (not shown). The briquetting press 15 is then operated to cause the upper punch 20 to move downward into the die cavity 24 in the die 18, compressing the charge 38 and at the same time forcing the lower punch 22 to yield and move downward in response to the overpowering pressure applied to it by the upper punch 20 through the charge 38 being compressed and redistributed within the die cavity 24. The hydraulic plunger 25 on which the lower ram 23 and the lower punch 22 are mounted yields downward in response to a pressure-regulated release of hydraulic fluid from the port 31.

As the tubular outer component 21 of the upper punch 20 passes downward through the cylindrical portion 28 of the die cavity 24, the hemispherical part 46 on the solid cylindrical inner component 19 thereof presses downward against the central portion of the powdered metal charge 38 while the serrated annular portion 40 compresses the annular outer portion of the charge 38 and at the same time impresses upon it the obliquely-serrated annular rim surface 56 (FIGURE 10). Meanwhile, the hemispherical die and lower and upper punch surfaces 26, 34 and 46 impress the outer and inner hemispherical surfaces 48 and 50 respectively thereon (FIGURE 3), as well as a narrow annular cylindrical zone 51 thereon adjacent the rim 56. When the briquetting is terminated, the hemispherical hollow shell 16 thus produced has a density of approximately 5.2 to 5.4.

Two such briquettes 16 for each bearing ball are prepared. The ball 12 is then placed within the hemispherical recess 50 in one of the hemispherical shells 16 anad the other shell 16 of the pair superimposed upon it (FIGURE 5) with the criss-crossed serrated rim surfaces 56 in contact with one another. This assembly 58 (FIGURE 5) is then placed in the die cavity 59 of a die 60 in a press 62 (FIGURES 5 and 6) between upper and lower punches 64 and 66 containing upper and lower hemispherical cavities 68 anad 70 corresponding in diameter to the outer surface 48 of each of the hemispherical shells 16. The press 62 is then operated to bring the punches 64 and 66 together upon the assembly 58, compressing it and thereby causing the density of the shells 16 to be increased from approximately 5.2 to 6.2. At the same time, the criss-crossed serrated surfaces 40 of the annular rims of the half shells 16 are pressed together with such force that the serrations 42 are crushed into an intervening particulate layer 72 in a manner similar to that shown in the Doll Patent No. 2,970,905 of Feb. 7, 1961, for Method of Making Composite Sintered Powdered Materials Article. The thus-prepared assembly 74 is then sintered in a conventional sintering oven at conventional sintering temperatures and times.

The sintered assembly 74 which is now completely joined together substantially unitarily is now heated and placed between the smaller-diameter hemispherical cavities 76 and 78 in the upper and lower coining dies 80 and 82 respectively of a coining press 84 (FIGURE 7) while in such a heated condition. This hot-coining operation is carried out to almost completely solidify the hollow spherical portion 86 composed of the further densified and sintered hemispherical shells 16 so that the final density obtained by such coining exceeds 98 percent of the theoretically solid density. The flattened cylindrical zones 51 meanwhile expand equatorially and thereby prevent the formation of flash. The coined and densified ball 88 removed from the coining press 84 is then heat-treated by conventional heat-treating methods and apparatus to harden it, and ground and finish-ground to bearing ball tolerances and finish, thereby becoming the composite light-weight bearing ball 10 of this invention (FIGURE 8).

I claim:
1. A composite lightweight antifriction bearing ball, comprising
 a spherical core of ceramic alumina,
 and a hollow spherical shell of sintered powdered steel overlying and surrounding said core in snugly-fitting relationship therewith.
2. A composite lightweight antifriction bearing ball, according to claim 1, wherein said core is of unglazed ceramic alumina.

References Cited

UNITED STATES PATENTS

| 3,144,710 | 8/1964 | Hollander et al. |
| 3,244,597 | 4/1966 | Tower _____ 176—45 |
| 3,300,303 | 1/1967 | Leach _____ 29—182.3 |

FOREIGN PATENTS

| 1,242,122 | 8/1960 | France. |

OTHER REFERENCES

"Alumina Ceramics," Industrial and Engineering Chemistry, vol. 54, No. 12, December 1962, pp. 18–23.

CARL D. QUARFORTH, Primary Examiner

A. J. STEINER, Assistant Examiner

U.S. Cl. X.R.

29—182.2, 182.5, 191.2, 196; 308—188